United States Patent [19]
Torricelli

[11] 3,842,865
[45] Oct. 22, 1974

[54] EXPANSION COMPENSATOR FOR LARGE ANGULAR MOVEMENTS

[75] Inventor: Paolo Torricelli, Pinto Torinese, Turin, Italy

[73] Assignee: Compagnia Italiana Tubi Metallici Flessibili S.p.A., Torino, Italy

[22] Filed: Nov. 16, 1972

[21] Appl. No.: 307,290

[30] Foreign Application Priority Data
July 22, 1972    Italy.................................. 69394/72

[52] U.S. Cl.............................. 138/121, 285/226
[51] Int. Cl........................ F16l 27/10, F16l 51/02
[58] Field of Search ........... 138/118, 119, 120, 121, 138/172, 173; 285/226

[56] References Cited
UNITED STATES PATENTS
| | | | |
|---|---|---|---|
| 1,185,459 | 5/1916 | Worley | 138/120 |
| 2,410,753 | 11/1946 | Shinomiya | 138/118 X |
| 2,886,066 | 5/1959 | Hansen | 138/118 X |
| 2,894,535 | 7/1959 | Hansen | 138/121 |
| 3,430,662 | 3/1969 | Guarnaschelli | 138/120 |

*Primary Examiner*—Charles A. Ruehl
*Attorney, Agent, or Firm*—Ladas, Parry, Von Gehr, Goldsmith & Deschamps

[57] ABSTRACT

An expansion compensator for large angular movements is described. Said compensator comprises a deformable bellows shaped member which is integrally connected with two sleeves at its ends, and inextensible and flexible means, secured to the sleeves and to the bellows member. When the compensator is subjected to an internal pressure, said means effect a constraint, which compels the bellows member, with the axes of the sleeves forming an angle with one another in a plane, to be disposed with its axis along a line having a constant curvature. In this manner, there is avoided the danger of locally reaching stresses higher than the maximum permissible value.

5 Claims, 8 Drawing Figures

PATENTED OCT 22 1974　　　　　　　　　　3,842,865

EXPANSION COMPENSATOR FOR LARGE ANGULAR MOVEMENTS

CROSS REFERENCE TO RELATED APPLICATION

Applicant claims priority from corresponding Italian Pat. application Ser. No. 69394-A/72 filed July 22, 1972.

BACKGROUND OF THE INVENTION

This invention relates to an expansion compensator for pipings, of the kind wherein the axes of the end sleeves become displaced so as to form an angle between one another in a plane; said angle can reach considerably high values.

The compensators of the prior art which are used in order to allow angular movements of the piping sections to which said end sleeves are secured, normally comprise a deformable bellows-shaped member and an assembly of tie rods connected therewith; the axis of the deformable bellows-shaped member will then be disposed along a curved line.

The main features of said bellows member are a high radial rigidity, due to the ribs constituted by the waves of the bellows, and a low rigidity against axial movements and angular displacements. In order to make use of this capacity of angular deformation of the bellows and, at the same time, to prevent a substantial elongation of the same, the bellows-shaped members are incorporated in rigid systems, namely the tie rod assemblies, which allow the aforementioned angular movements.

Said tie rod assemblies generally comprise two arms, united together by means of two pins with coincident axes and bound to the connection sleeves disposed at the end portions of the bellows. Therefore, said arms and sleeves can rotate about the axes of the pins. When the axes of said sleeves are caused to rotate so as to form an angle therebetween, then the axis of the bellows-shaped member will be disposed along a curved line. resultant forces, two of which acting upon the two end faces of the bellows, whilst the other two resultant forces are applied upon the external shell of the bellows and upon the internal shell of the same, respectively. This system of forces, together with the reactions exerted by the assembly of the rods, will cause the compensator to assume an equilibrium position. In fact, the tie rod assembly will apply two reaction forces which are equal and opposed to the resultant forces acting upon the end faces of the bellows; however, the couple of the resultant forces, exerted upon said shells will remain unbalanced. Now, since the surface of the external shell is much greater than the internal surface, and being the resultant force proportional to the area of the surface upon which it is exerted, said force directed outwardly will be higher than that directed towards the inside of the curvature. The axis of the deformable bellows member, in order to reach an equilibrium position, will therefore be disposed along a curved line which is different from an arc of a circle, and in same points, the maximum capacity for deformation of the bellows will be reached.

This is the fundamental impediment to the attainment of large angular displacements with the compensators described above.

For low internal pressures, such a phenomenon is limited; in fact, the bellows will have a certain rigidity which is a function of its own geometry, as well as of its thickness and the material involved. On the contrary, when the pressure exceeds a certain limit value, the phenomenon described above will be self-enhanced; in fact, for a greater deformation of the bellows, an increase of the unbalance between said forces will result, which involves still greater deformations, which are no longer sufficiently contrasted by the own rigidity of the bellows.

Therefore, each bellows will have, a lowest bending radius, which will be in a position which is symmetrical relative to the end portions of the bellows, and which cannot be inferior to a certain value, without having damage to the same member. Accordingly, it will neither be possible, in order to obtain large angular movements, to construct very long bellows, since the phenomenon described above would otherwise occur, due to the unbalance between the resultant forces on the extrados and intrados shells.

Moreover, by assuming that the axis of the bellows can be disposed along an arc of a circle, with a tie rod assembly of the known kind, in the undeformed position, i.e., with the axes of the sleeves coincident with one another, the length of the bellows will be equal to the length of the two arms of the aforementioned assembly; instead, in the deformed position, namely with the axes of said sleeves at an angle to one another, the length of said arms will be greater than that of said arc of a circle and of the bellows, and this difference will be the greater the wider is the angle described. Accordingly, such a tie rod assembly will submit the bellows to compression efforts, while passing from the underformed to the deformed position.

Obviously, the problems mentioned above will not be completely solved by subdividing the compensator into a plurality of short compensators connected to one another, each comprising the tie rod assembly of the conventional kind already described and a short bellows-shaped member including a small number of undulations, inasmuch as both the disadvantages enumerated above would not be obviated, i.e., a compression of the bellows upon variation of its angular position and a disposition of the same along a curved line which is different from an arc of a circle; moreover, such arrangement would involve considerable complexities of design.

SUMMARY OF THE INVENTION

According to the present invention there is provided a compensator for large angular movements, comprising:

a deformable bellows-shaped member, the walls of which are undulatory such as to form a series of ridges and grooves of substantially sinusoidal configuration, and the ends of which are integrally connected with sleeves;

a plurality of annular members disposed in said grooves of said bellows-shaped member and provided with two projections having centrally disposed thereon a slot parallel to the axis of said annular member and the cross-sectional configuration of said projections being decreasing towards the side ends, said annular member being disposed so that a diametric plane, passing through the axis of said compensator, will pass through all said slots;

a pair of flexible and inextensible means disposed in a diametrically opposite position with respect to each other and each comprising a continuous element provided with two central parallel and contiguous sections disposed inside said slots and with two curved end sections connecting said central sections, there being disposed inside said end sections means for anchoring said flexible means to said sleeves, said flexible and inextensible means provides a constraint for said compensator in order to allow the axes of the sleeves of said bellows-shaped member, subjected to an internal pressure, to form an angle with respect to each other solely in the plane perpendicular to said diametrical plane passing through said slots, and that the axis of said compensator is disposed solely along a line having a constant curvature in said perpendicular plane;

a deformable bellows-shaped member integrally connected with two sleeves at its ends;

inextensible and flexible means, secured to said sleeves and to said bellows-shaped member, so as to realize a constraint for said compensator, in order to compel said deformable bellows-shaped member, subjected to an inner pressure, and with the axes of said sleeves forming an angle with one another in a plane, to dispose itself with its axis substantially along a line having a constant curvature in said plane, this plane being univocally determined.

BRIEF DESCRIPTION OF THE DRAWINGS

For a better understanding of the present invention, some particular embodiments thereof will now be described, merely by way of non-limiting example, with reference to the accompanying drawings, wherein.

DETAILED DESCRIPTION OF THE INVENTION

Figure 1:
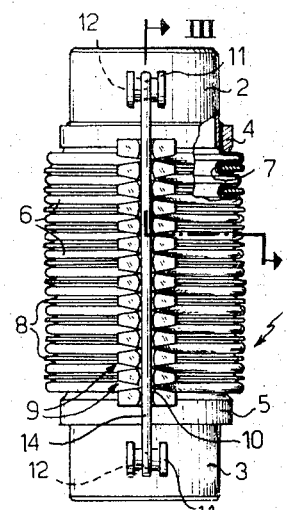
FIGS. 1 and 2 show side views, partly in section, of a first and a second embodiment of the compensator object of the present invention.

With reference to FIG. 1, the compensator object of the present invention comprises a deformable bellows-shaped member 1, connected with end sleeves 2 and 3 by means of rings 4 and 5 respectively, which lock the ends of the member 1 against said sleeves.

Figure 4:
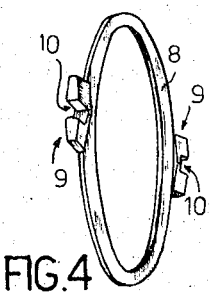
FIG. 4 is a perspective view of a ring of the compensators illustrated in FIGS. 1 and 2.
Figure 5:
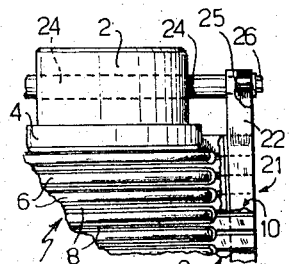
FIG. 5 is a side view of a portion of the compensator illustrated in FIG. 2, partly in section along lines V—V.

The bellows member 1 comprises a plurality of crests 6 on its lateral surface, so as to form a number of grooves 7. In each of these grooves a circular ring 8 is disposed (FIG. 4), which is provided with two projections 9, diametrically opposite to one another. Each of said projections is formed with a slot 10. All the rings 8 are mounted with their projections 9 aligned, so that a diametral plane, passing through the axis of the compensator, will pass through all the slots of the various rings also.

On each of the end sleeves 2 and 3 there are fastened, in diametrically opposite positions, two pair of supports 11, which are united at their ends by means of a peg 12 perpendicular thereto.

Figure 3:
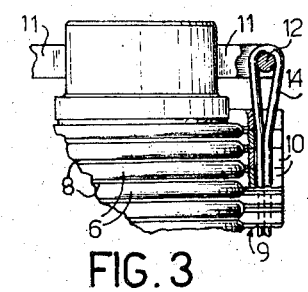
FIG. 3 is a side view, of a portion of the compensator illustrated in FIG. 1, partly in section along lines III—III.

Two continuous cables 14, constituted by a plurality of braided wires, are each anchored to two pegs 12, belonging to the sleeves 2 and 3, respectively. Said cables 14 are disposed (FIG. 3) within the slots 10 of the various rings 8.

Figure 2:
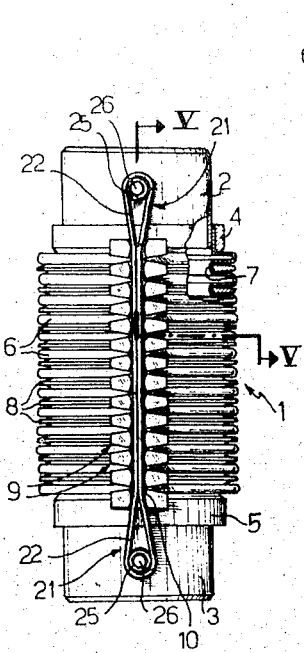

The embodiment illustrated in FIG. 2 differs from the one just described in that it comprises, instead of the cables 14 connecting the two end sleeves 2 and 3, two bands 21 constituted by a plurality of thin metallic overlapped laminations 22.

The band 21, which is constructed so as to be continuous, is connected to the end sleeves 2 and 3 by inserting it, for instance, about bars 24 which pass through said sleeves throughout a diameter. At the top of said bars 24, washers 25 and nuts 26 are disposed, in order to avoid loosening of the bands 21, which will therefore remain positioned within the various slots 10 of the rings 8.

The band 21 can be realized in different modes; it can be formed by the various thin overlapped laminations 22, each of which comprises a ring which is cut and welded in points suitably staggered from one another; or it can also be realized with a continuous strip, by winding up a lamination and by welding respectively, the beginning and the end of the strip.

Figure 8:
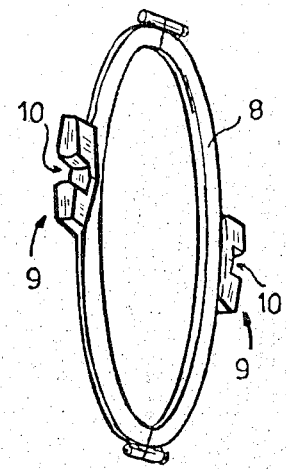
FIG. 8 is a perspective view of a second embodiment of a ring of the compensators illustrated in FIGS. 1 and 2.

In the various embodiments described above, the circular rings 8 can be constructed in different manners. For instance, they can be manufactured in a single piece (FIG. 4), if the bellows-shaped member 1 is deformed to form the various crests 6 and grooves 7, with an appropriate operating machine, after inserting the various rings; or they can also be constructed in two pieces (FIG. 8), then disposed in the grooves 7 and finally bolted together.

The operation of the compensator object of the present invention is as follows.

Figure 7:
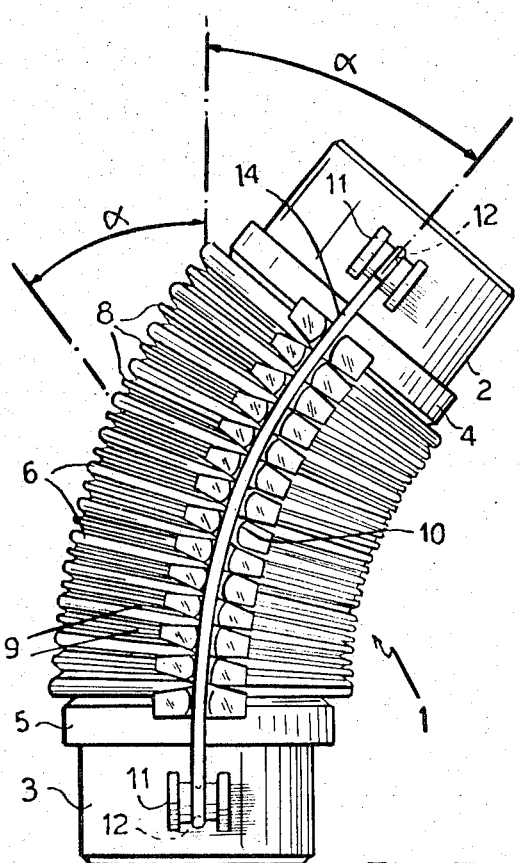
FIG. 7 is a side view of the compensator illustrated in FIG. 1, in a position wherein the axes of the end sleeves form an angle α therebetween.

By causing one end sleeve to perform an angular movement, the compensator will then assume, i.e., for the first embodiment, the configuration of FIG. 7; in this configuration, the axis of the bellows-shaped member 1 will be disposed substantially along one arc of a circle.

In fact, the force exerted upon each undulation of the bellows-shaped member 1, as the difference between the forces exerted on the extrados and the intrados shells, is supported by the constraint constituted by the union of said rings 8, with the cable 14 or the band 21.

Therefore, the cable 14 or the band 21, are subjected to a system of forces constituted by the resultant forces exerted upon the end sleeves 2 and 3, and by forces directed radially, in each point of contact with the projections 9. As a consequence of these forces, both the cable 14 and the band 21, will assume a configuration which is substantially that of an arc of a circle.

In this manner, the first serious difficulty encountered previously in the construction of compensators for large angular movements is easily eliminated.

In fact, in accordance with this embodiment, even for considerable axial lengths of said bellows-shaped members, and with high inner pressures, they will always assume the configuration of an arc of a circle, thereby avoiding the danger and the limitation to locally reach stresses higher than the maximum permissible values.

Moreover, inasmuch as the cable 14 and the band 21 are substantially inextensible, the second disadvantage mentioned above will also be eliminated; in other words, the length of the axis of the bellows-shaped member 1 will no longer undergo any variation, whatever its angular configuration may be. In this manner, any compression effort to the compensator will be avoided.

Thus, it will be possible to realize the union of a deformable bellows member 1, having a high radial rigidity in order to withstand the inner pressure, a low resistance to bending of the axis as well as a low stiffness in axial direction, with an assembly of the tie rods which has the characteristic of being inextensible, in order to obviate the deformability of the bellows member in axial direction, and flexible, in order to follow, point by point, the curved line of the axis of the bellows.

Since an inextensible element (in this instance, the cable 14 or the band 21), fixed at both ends, under the action of a system of uniformly distributed normal forces, will assume the configuration of an arc of a circle, by connecting said element to the end sleeves 2 and 3 and, through the rings 8, by subjecting the same to said system of normal forces, both said inextensible element and the bellows members connected to the latter, will dispose themselves along an arc of a circle.

In the embodiment of FIG. 1, during the angular movement, a sliding between the various wires constituting the cable 14 will occur.

Figure 6:
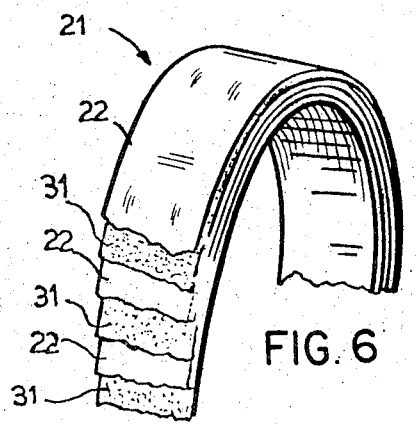
FIG. 6 is a perspective view, partly in section of a second embodiment of the band of laminations of the compensator illustrated in FIG. 2.

A similar sliding movement will also occur between the various thin laminations 22 constituting the band 21. Further, in order to allow a better sliding between the various laminations 22, some sheets 31 of antifriction material (FIG. 6) can be interposed; for this purpose the "Teflon" is suitably used. One of said sheets can also be disposed inside and outside said band 21, so as to promote the sliding movement between the band 21 and the bars 24 and the projections 9 of the rings 8, respectively.

In order to avoid any possible removal of the cable 14 or the band 21 from the slots 10, to the projections 9 of the rings 8 some elements (not shown) can be fastened, which close said slots in correspondence of their tops.

Further, between each pair of adjacent rings 8, in the region of the projections 9, connection means (not shown) can be housed, suitably small balls or keys, having the purpose of preventing any sliding of said rings relative to one another.

It will be apparent that many modifications and variations can be introduced in the embodiment of the present invention described above concerning both the shape and the arrangement of the various parts and components, without departing from the scope of the invention.

What we claim is:

1. Compensator for large angular movements, comprising:

a deformable bellows-shaped member, the walls of which are undulatory such as to form a series of ridges and grooves of substantially sinusoidal configuration, and the ends of which are integrally connected with sleeves;

a plurality of annular members, each annular member encircling a different one of said grooves of said bellows-shaped member and each provided with two diametrically opposed projections, said projections having a centrally disposed slot formed therein and the cross-sectional configuration of each projection decreasing from the slot towards the side ends, said annular members being disposed so that a diametric plane, passing through the centroidal axis of said compensator, will pass through all said slots;

a pair of flexible and inextensible means disposed in a diametrically opposite position with respect to each other and each comprising a continuous element provided with two central parallel and contiguous sections disposed inside said slots and with two curved end sections connecting said central sections, there being disposed inside said end sections means for anchoring said flexible means to said sleeves, said flexible and inextensible means providing a constraint for said compensator in order to allow the axes of the sleeves of said bellows-shaped member, subjected to an internal pressure, to form an angle with respect to each other, solely in the plane perpendicular to said diametrical plane passing through said slots, and that the axis of said compensator is disposed solely along a line having a constant curvature in said perpendicular plane.

2. The compensator of claim 1, wherein each of said flexible and inextensible means comprises a continuous cable.

3. The compensator of claim 1, wherein each of said flexible and inextensible means comprises a continuous metal band, said band comprising a plurality of overlapped sheets of laminations, said band being parallel to said diametrical plane passing through said slots.

4. The compensator of claim 3, wherein at least one strip of antifriction material is disposed between said sheets of laminations.

5. The compensator of claim 1, wherein said annular members comprise two half-rings connected to one another.

* * * * *